US006963966B1

(12) United States Patent
Carrillo (10) Patent No.: US 6,963,966 B1
(45) Date of Patent: Nov. 8, 2005

(54) ACCUMULATOR-BASED LOAD-STORE CPU ARCHITECTURE IMPLEMENTATION IN A PROGRAMMABLE LOGIC DEVICE

(75) Inventor: Jorge Ernesto Carrillo, Belmont, CA (US)

(73) Assignee: Xilinx, Inc., San Jose, CA (US)

( * ) Notice: Subject to any disclaimer, the term of this patent is extended or adjusted under 35 U.S.C. 154(b) by 426 days.

(21) Appl. No.: 10/209,516

(22) Filed: Jul. 30, 2002

(51) Int. Cl.$^7$ .............................................. G06F 17/50
(52) U.S. Cl. ...................... 712/37; 326/41; 712/221; 716/16
(58) Field of Search .......................... 326/41; 70/523, 70/603; 712/37, 221; 716/16

(56) References Cited

U.S. PATENT DOCUMENTS

| 5,968,161 A | * | 10/1999 | Southgate ..................... 712/37 |
| 6,434,584 B1 | * | 8/2002 | Henderson et al. ......... 708/490 |
| 6,775,760 B1 | * | 8/2004 | Shigeki ....................... 712/37 |

OTHER PUBLICATIONS

Xilinx; "Virtex -II Platform FPGA Handbook"; published Dec. 6, 2000; available from Xilinx, Inc.; 2100 Logic Drive, San Jose, California 95124; pp. 33-75.

* cited by examiner

Primary Examiner—Kenneth S. Kim
(74) Attorney, Agent, or Firm—Lois D. Cartier; LeRoy D. Maunu (57) ABSTRACT

Methods and structures for efficiently implementing an accumulator-based load-store CPU architecture in a programmable logic device (PLD). The PLD includes programmable logic blocks, each logic block including function generators that can be optionally programmed to function as lookup tables or as RAM blocks. Each element of the CPU is implemented using these logic blocks, including an instruction register, an accumulator pointer, a register file, and an operation block. The register file is implemented using function generators configured as RAM blocks. This implementation eliminates the need for time-consuming accesses to an off-chip register file or to a dedicated RAM block.

28 Claims, 7 Drawing Sheets

ACCUMULATOR-BASED LOAD-STORE CPU ARCHITECTURE IMPLEMENTATION IN A PROGRAMMABLE LOGIC DEVICE

FIELD OF THE INVENTION

The invention relates to a central processing unit (CPU) for a computer system implemented in a programmable logic device (PLD). More particularly, the invention relates to an efficient PLD implementation of an accumulator-based load-store CPU architecture.

BACKGROUND OF THE INVENTION

Figure 1:
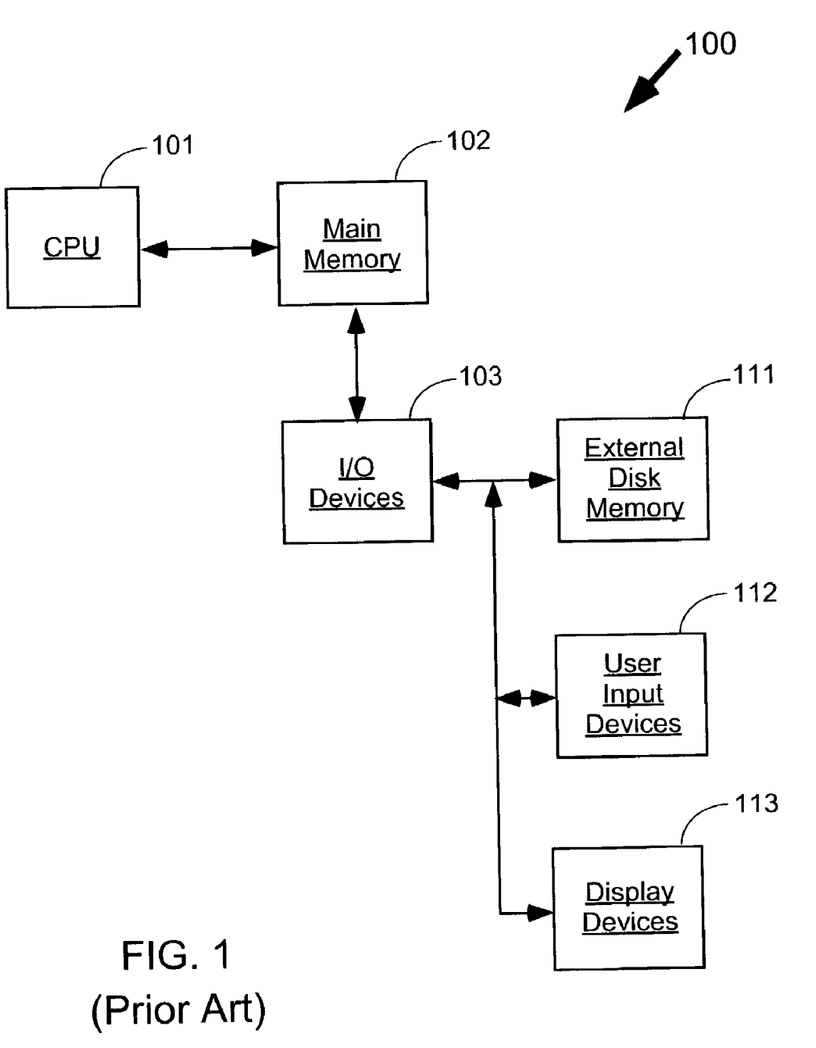
FIG. 1 is a block diagram of a typical computer system.

A computer system typically contains a CPU, a main memory, and one or more input/output (I/O) devices. FIG. 1 is a simplified diagram of a computer system 100. The CPU 101 fetches instructions from the main memory 102, and then executes these instructions. Main memory 102 is a memory storage device that stores blocks of instructions and data copied from an external disk memory 111 that is accessed via the I/O devices 103. I/O devices 103 are used to access external devices such as disk memory 111, user input devices 112 (e.g., keyboards), and display devices 113 (e.g., monitors).

Memory access times play an important role in determining the operating speed of a computer system. Accesses to disk memory are much slower than accesses to main memory, because the instructions and data must be provided through an I/O device. Therefore, the main memory is provided to reduce the frequency of accesses to disk memory. However, instructions that require accessing main memory are still significantly slower than instructions that can be carried out entirely within the CPU.

Figure 2:
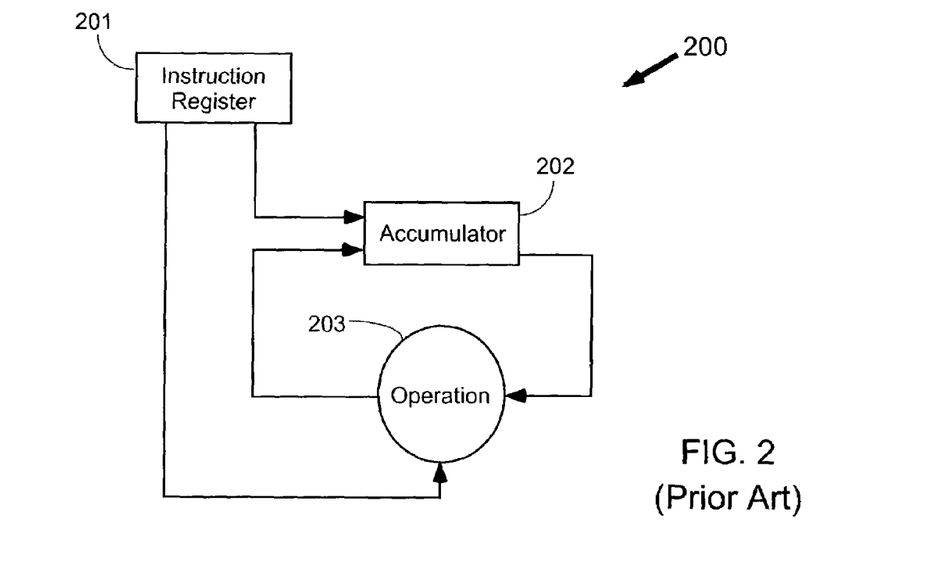
FIG. 2 is a block diagram of an accumulator-based CPU.

FIG. 2 shows a first type of CPU having an "accumulator-based" CPU architecture. Accumulator-based CPU 200 includes an instruction register 201, an accumulator 202, and an operation block 203. Instruction register 201 is a register in which the currently-executing instruction is stored. Accumulator 202 is a special register that provides one of the values on which the current instruction operates, and for some instructions (e.g., when the instruction provides a numerical result) is also used to store the result of the instruction. Operation block 203 is a control and execution circuit that can include, for example, an Arithmetic Logic Unit (ALU), a program counter register containing an address pointer to the main memory location in which the next instruction is stored, a parallel port providing access to the main memory, and so forth.

Accumulator-based CPUs were among the earliest-developed CPUs. They are best used in architectures having a relatively small instruction size, e.g., 8–16 bits. To reduce the instruction size, only one source address is included in the instruction, and no destination address is included. Instead, the value in the accumulator is always used as one of the operands, and the destination address is always the accumulator. Thus, at most one memory address is included in the instruction, that of the second operand.

Because only one operand is specified in each instruction, accumulator-based CPUs allow efficient instruction encoding and decoding, which decreases the cycle time of the CPU.

As an example of accumulator-based operation, the following sequence of pseudo-code instructions performs the function "a=b+c+d" in an accumulator-based CPU. The letters "a", "b", "c", and "d" are addresses in main memory. The term "Acc" refers to the accumulator. Note that four memory accesses are required; three to fetch the operands, and one to store the result. Each of these memory accesses has an associated latency, which is added to the latency of the arithmetic (e.g., addition) operation.

| (1) | load  | b | // Acc ← b       |
| --- | ----- | - | ---------------- |
| (2) | add   | c | // Acc ← Acc + c |
| (3) | add   | d | // Acc ← Acc + d |
| (4) | store | a | // a ← Acc       |

In step (1), the value at memory location "b" is loaded into the accumulator. In step (2), the value at memory location "c" is added to the value in the accumulator. In step (3), the value at memory location "d" is added to the value in the accumulator. In step (4), the value in the accumulator is stored in memory location "a".

Figure 3:
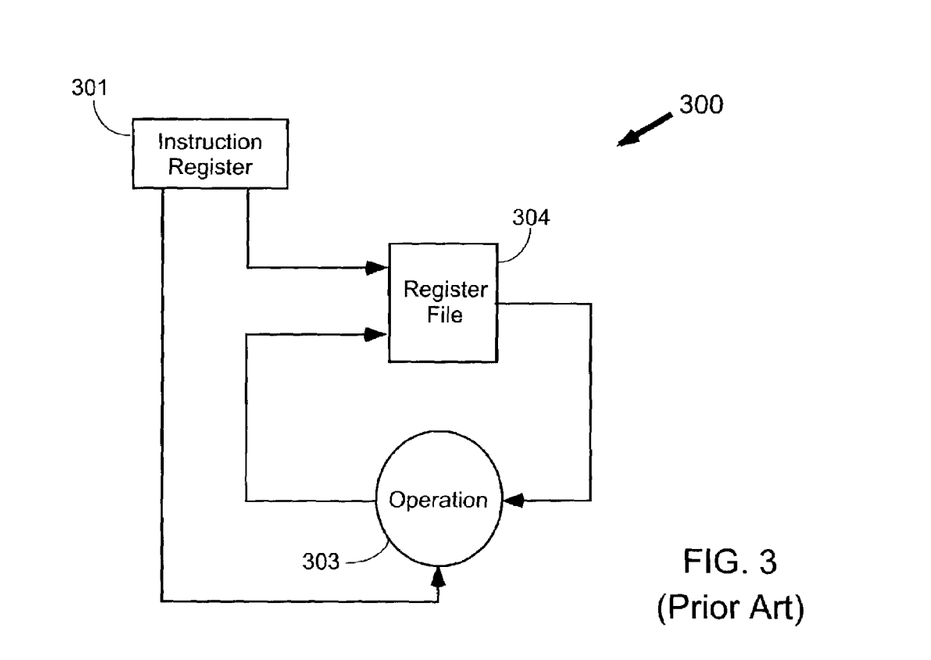
FIG. 3 is a block diagram of a load-store CPU.

FIG. 3 shows another CPU architecture called a "load-store" architecture. A load-store architecture does not include an accumulator; instead, a register file 304 is used. (Other portions of CPU 300 are similar to those of FIG. 2; therefore, they are not further described here.) Register file 304 includes several registers that can be used as source registers and destination registers for instructions executed by the operation block.

For example, the following sequence of pseudo-code instructions performs the function "a=b+c+d" in a load-store CPU. In this CPU, the register file includes at least five registers, R1–R5.

| (5)  | load  | R1,b     | // R1 ← b       |
| ---- | ----- | -------- | --------------- |
| (6)  | load  | R2,c     | // R2 ← c       |
| (7)  | load  | R3,d     | // R3 ← d       |
| (8)  | add   | R4,R1,R2 | // R4 ← R1 + R2 |
| (9)  | add   | R5,R4,R3 | // R5 ← R4 + R3 |
| (10) | store | a, R5    | // a ← R5       |

In step (5), the value at address "b" is stored in register R1. In step (6), the value at address "c" is stored in register R2. In step (7), the value at address "d" is stored in register R3. In step (8), the values stored in registers R1 and R2 are added, and the result is stored in register R4. In step (9), the values stored in registers R4 and R3 are added, and the result is stored in register R5. In step (10), the value stored in register R5 is stored in address "a" of the main memory.

In comparing the two instruction sequences, it can be seen that the same number of memory accesses are required, i.e., three memory reads to load the values stored at locations "b", "c", and "d", and one memory write to store the result at location "a". However, in the load-store sequence (steps (5)–(10)), the memory accesses (i.e., the load and store commands) have been separated from the add instructions. This separation allows for simpler instructions (e.g., a simpler operation block) and a consequent faster CPU cycle time.

Additionally, separating memory accesses from execution instructions such as the add instruction allows compilers to produce highly optimized code. For example, the values of "b", "c", "d", "b+c", and "b+c+d" remain in the register file, and can be reused by the program at a later time without fetching the values from memory or recalculating the addition results. Thus, the total number of memory accesses is typically reduced. Because memory accesses often make a significant contribution to the overall execution time of a program, a load-store CPU can execute some types of code significantly faster than an accumulator-based CPU. However, load-store architectures typically require a larger instruction size, in order to specify two operands and a destination address.

Figure 4:
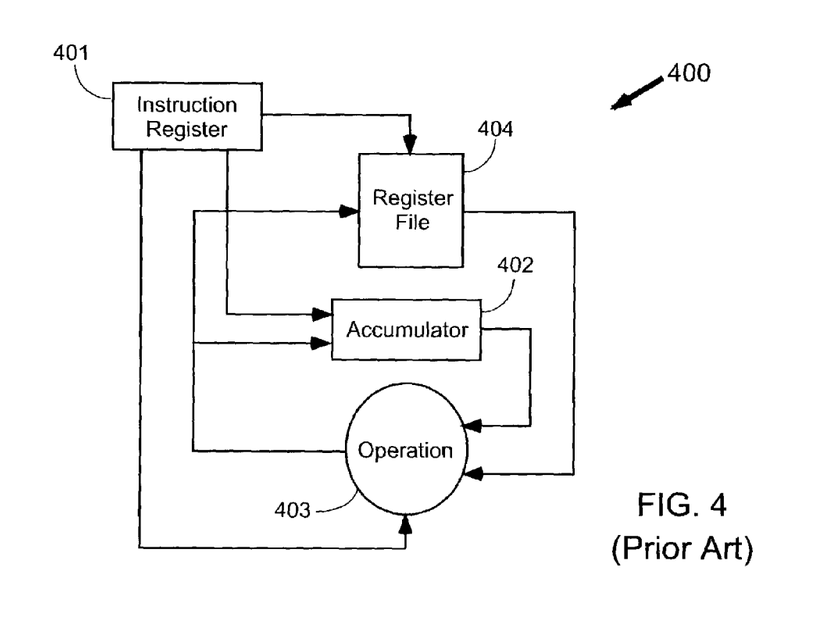
FIG. 4 is a block diagram of a load-store CPU with a fixed accumulator.

Another type of CPU architecture combines the architectural features of the accumulator-based and load-store CPUs. FIG. 4 shows a first such architecture, a load-store CPU with a fixed accumulator. CPU 400 includes both an accumulator 402 and a register file 404. Values are loaded from main memory to the accumulator, stored into main memory from the accumulator, and moved back and forth between the accumulator and the register file. The accumulator also provides one operand and serves as the destination address for instructions. Thus, the register file essentially provides a "local memory" for the accumulator.

Following is an exemplary sequence of instructions that execute the function "a=b+c+d" in the accumulator-based load-store architecture of FIG. 4.

| (11) | load  | b  | // Acc ← b       |
|------|-------|----|------------------|
| (12) | movea | R1 | // R1 ← Acc      |
| (13) | load  | c  | // Acc ← c       |
| (14) | movea | R2 | // R2 ← Acc      |
| (15) | load  | d  | // Acc ← d       |
| (16) | add   | R2 | // Acc ← Acc + R2|
| (17) | add   | R1 | // Acc ← Acc + R1|
| (18) | store | a  | // a ← Acc       |

In step (11), the value at address "b" is stored in the accumulator. In step (12), the value in the accumulator is stored in register R1. In step (13), the value at address "c" is stored in the accumulator. In step (14), the value in the accumulator is stored in register R2. In step (15), the value at address "d" is stored in the accumulator. In step (16), the value in register R2 is added to the accumulator. In step (17), the value in register R1 is added to the accumulator. In step (18), the value in the accumulator is stored in address "a" of the main memory.

The accumulator-based load-store CPU of FIG. 4 has the advantage that small instruction sizes can be used, because only one operand is required, as in the accumulator-based CPU of FIG. 2. However, any operation performed changes the value in the accumulator. This makes it difficult for a compiler to optimize the code.

Figure 5:
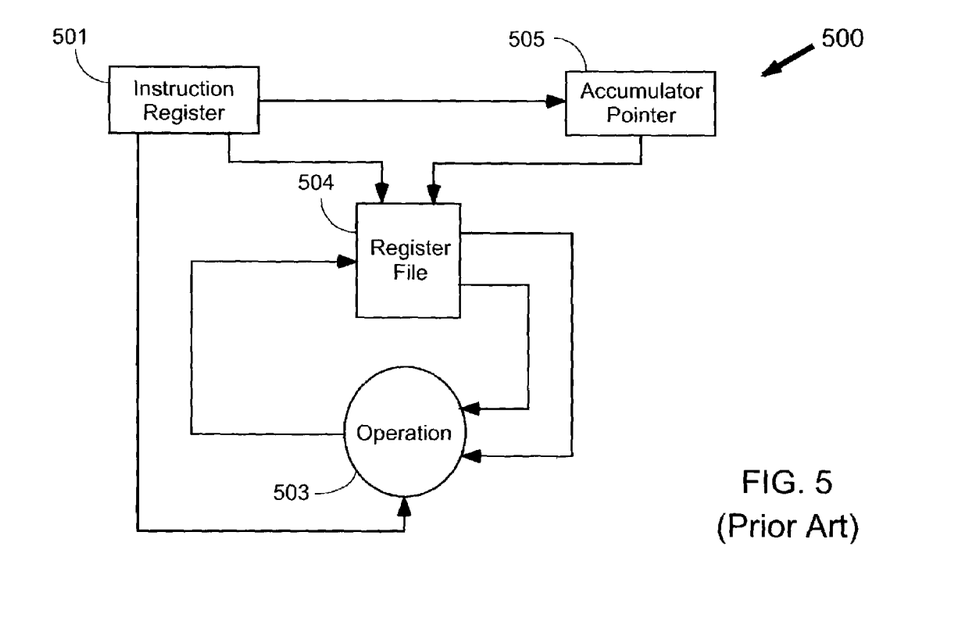
FIG. 5 is a block diagram of a load-store CPU with a moveable accumulator.

FIG. 5 shows another CPU architecture that more successfully combines the virtues of the accumulator-based and load-store architectures, a load-store CPU with a moveable accumulator. CPU 500 includes a register file 504 in which any one of the registers can act as an accumulator. An accumulator pointer 505 selects one of the registers in register file 504 and designates that register as the accumulator. The value of the accumulator pointer can be changed using a "set" instruction. By setting the location of the accumulator prior to executing another instruction, operations can be performed in any register in the register file, and the results can be left in the register file for later use, minimizing accesses to main memory.

For example, the following pseudo-code implements the function "a=b+c+d" in the accumulator-based load-store architecture of FIG. 5.

| (19) | set  | 1 | // Acc = R1 |
|------|------|---|-------------|
| (20) | load | b | // R1 ← b   |
| (21) | set  | 2 | // Acc = R2 |

-continued

| (22) | load  | c  | // R2 ← c      |
|------|-------|----|----------------|
| (23) | set   | 3  | // Acc = R3    |
| (24) | load  | d  | // R3 ← d      |
| (25) | add   | R2 | // R3 ← R3 + R2|
| (26) | add   | R1 | // R3 ← R3 + R1|
| (27) | store | a  | // a ← R3      |

In step (19), register R1 of the register file is selected to act as the accumulator. In step (20), the value at address "b" is stored in register R1. In step (21), register R2 of the register file is selected to act as the accumulator. In step (22), the value at address "c" is stored in register R2. In step (23), register R3 of the register file is selected to act as the accumulator. In step (24), the value at address "d" is stored in register R3. In step (25), the value in register R2 is added to the value stored in register R3. In step (26), the value in register R1 is added to the value stored in register R3. In step (27), the value in register R3 is stored in address "a" of the main memory.

As described above, the accumulator-based load-store CPU architecture shown in FIG. 5 successfully combines the advantages of accumulator-based and load-store architectures. Only a single operand is included in each instruction, so the instruction size can be small. However, the moveable accumulator permits a compiler to retain the operands of previous instructions in the register file, which can significantly reduce the number of memory accesses.

The use of programmable logic devices (PLDs) to implement CPUs is increasing rapidly. PLDs are now available that include dedicated on-board CPUs, such as the Virtex®-II Pro family of field programmable gate arrays (FPGAS) from Xilinx, Inc. However, some PLD users prefer to implement "soft processors" in their PLDs, i.e., microprocessors built from the fabric of programmable logic blocks traditionally included in PLDS, and configured using a configuration bitstream. Because a "soft" PLD implementation generally uses more silicon area than a processor designed using dedicated transistors (a "hard" processor), these soft processors preferably have a small instruction size.

Therefore, it is desirable to provide a PLD implementation of an accumulator-based load-store CPU architecture that promotes the efficient use of PLD resources and the rapid execution of CPU instructions.

SUMMARY OF THE INVENTION

The invention provides methods and structures for efficiently implementing an accumulator-based load-store CPU architecture in a programmable logic device (PLD). The PLD includes programmable logic blocks, each logic block including function generators that can be optionally programmed to function as lookup tables or as RAM blocks. Each element of the CPU is implemented using these logic blocks, including an instruction register, an accumulator pointer, a register file, and an operation block. The register file is implemented using function generators configured as RAM blocks. This implementation eliminates the need for time-consuming accesses to an off-chip register file or to a dedicated RAM block.

In some embodiments, the PLD is an FPGA, and the logic blocks are CLBs (configurable logic blocks).

A first aspect of the invention provides a circuit implementation of a CPU in a PLD that includes a plurality of programmable logic blocks and programmable routing resources interconnecting the logic blocks. The circuit implementation includes at least a first logic block configured to implement an instruction register, at least a second logic block configured to implement an accumulator pointer, at least a third logic block configured to implement an operation block, and at least a fourth logic block configured to implement a register file. The circuit implementation also includes routing resources that are configured to couple the first logic block to the second, third, and fourth logic blocks, and the fourth logic block to the second and third logic blocks. The logic block or blocks implementing the register file do so by configuring the function generators within the logic blocks as RAM blocks. Thus, for example, a register file can be implemented in the function generators of a single logic block.

In one embodiment, the routing resources provide signals from the instruction register to the accumulator pointer, from the instruction register to the operation block, from the instruction register to the register file, from the accumulator pointer to the register file, from the operation block to the register file, and from the register file to the operation block.

In some embodiments, the logic blocks used to implement the various elements of the CPU are all distinct from each other. In other embodiments, a single logic block is used to implement two different elements. For example, the function generators of a logic block can be used to implement at least a portion of the operation block, while the one-bit registers in the logic block are used to implement the instruction register or the accumulator pointer.

Another aspect of the invention provides a method of implementing a CPU in a PLD. The method includes configuring at least a first logic block to implement an instruction register, configuring at least a second logic block to implement an accumulator pointer, configuring at least a third logic block to implement an operation block, and configuring at least a fourth logic block to implement a register file. The register file is implemented by configuring the function generators within the logic blocks as RAM blocks. The method also includes configuring routing resources to couple the first logic block to the second, third, and fourth logic blocks, and the fourth logic block to the second and third logic blocks.

According to another aspect of the invention, a CPU implemented in a PLD includes an accumulator pointer, an operation block, an instruction register, and a register file. The instruction register has a first output terminal coupled to a first input terminal of the operation block, and a second output terminal coupled to an input terminal of the accumulator pointer. The register file has a first input terminal coupled to an output terminal of the accumulator pointer, a second input terminal coupled to an output terminal of the operation block, a third input terminal coupled to a third output terminal of the instruction register, and first and second output terminals coupled to second and third input terminals of the operation block. The register file implementation includes one or more programmable logic blocks of the PLD, the logic blocks comprising function generators optionally configurable as RAM blocks, the function generators of the register file being configured as RAM blocks in which the register file data is stored during operation of the CPU.

Another aspect of the invention provides a PLD that includes programmable logic blocks and programmable routing resources interconnecting the logic blocks. Each logic block includes one-bit registers and function generators that are optionally configurable as lookup tables and as RAM blocks. The PLD includes logic blocks configured to implement an instruction register, an accumulator pointer, an operation block, a register file, and routing resources interconnecting these elements. The register file is implemented by configuring pairs of function generators of the respective logic block as dual-port RAM blocks.

In one embodiment, the instruction register is implemented using the one-bit registers in a first logic block, the accumulator pointer is implemented using the one-bit registers in a second logic block, and the operation block is implemented by configuring the function generators in a third logic block as lookup tables. In some embodiments, these elements are implemented in distinct logic blocks. In other embodiments, elements implemented in function generators are combined with elements implemented in one-bit registers in a single logic block.

BRIEF DESCRIPTION OF THE DRAWINGS

The present invention is illustrated by way of example, and not by way of limitation, in the following figures.

DETAILED DESCRIPTION OF THE DRAWINGS

The present invention is believed to be applicable to a variety of PLD and PLD implementation systems. The present invention has been found to be particularly applicable and beneficial for FPGAs including arrays of programmable logic blocks known as CLBs. While the present invention is not so limited, an appreciation of the present invention is presented by way of specific examples directed to these FPGAs.

Programmable logic devices (PLDs) are a well-known type of digital integrated circuit that can be programmed to perform specified logic functions. One type of PLD, the field programmable gate array (FPGA), typically includes an array of configurable logic blocks (CLBs) that connect to off-chip components via programmable input/output blocks (IOBs). The CLBs and IOBs are interconnected by a programmable interconnect structure. Some FPGAs also include additional logic blocks with special purposes (e.g., DLLs, block RAM, and so forth).

The interconnect structure, CLBs, IOBs, and other logic blocks are typically programmed by loading a stream of configuration data into internal configuration memory cells that define how the interconnect structure and the various logic blocks are configured. The configuration data can be read from memory (e.g., an external PROM) or written into the FPGA by an external device. The collective states of the individual memory cells then determine the function of the FPGA.

A user's design is typically "implemented" in a PLD by implementation software provided by the PLD manufacturer. The implementation software accepts a design description in netlist format, assigns the logic elements of the design to the various available logic blocks, and designates the interconnect paths that will be used to couple the logic blocks together. The end result provided by the implementation software is a stream of configuration data targeted to a specific PLD. Thus, the number of device resources used and the speed of the resulting circuit are heavily dependent upon the implementation software. For example, the choice of which logic blocks to use to implement the various sub-circuits in the design can be critical.

Figure 6:
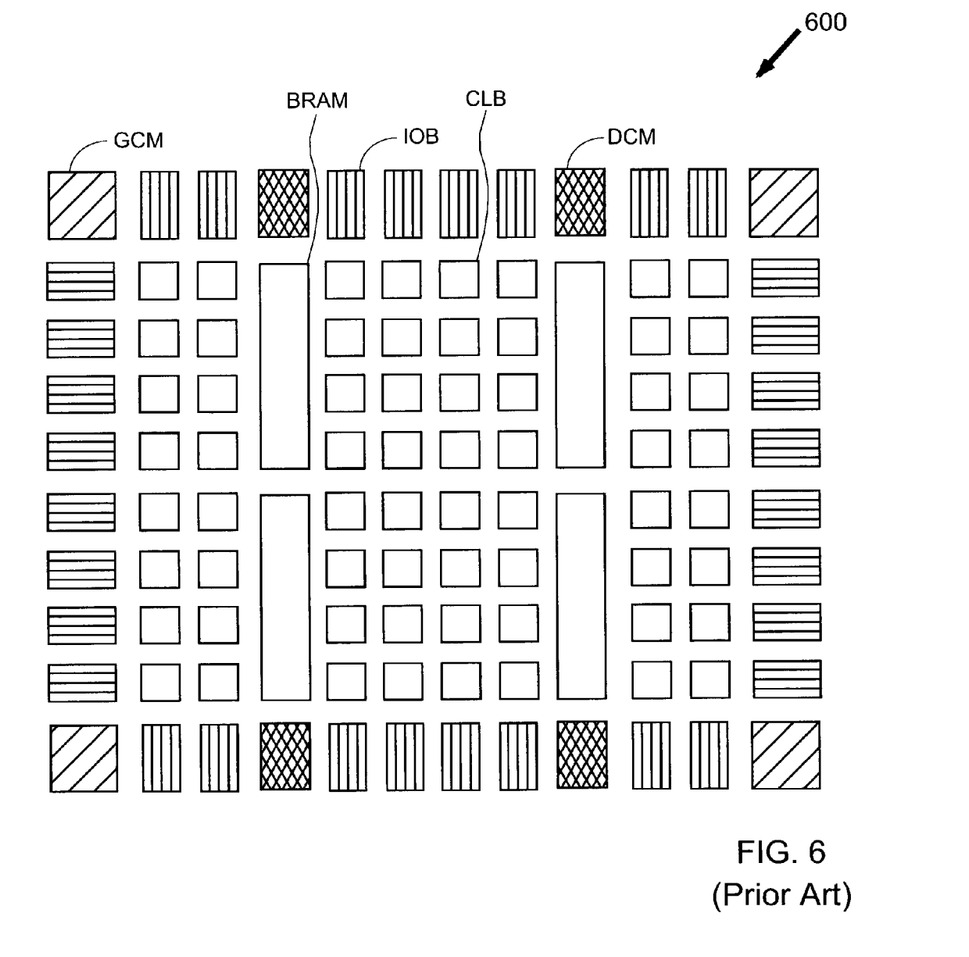
FIG. 6 is a block diagram of an exemplary FPGA.

FIG. 6 is a block diagram of a Virtex®-II FPGA, one type of FPGA that includes several different types of logic blocks. In addition to the standard CLBs and IOBs, the Xilinx Virtex-II FPGA includes blocks of Random Access Memory (BRAM) and blocks implementing Global Clock Managers (GCM) and Digital Clock Managers (DCM). The interconnect structure is not shown in FIG. 6, for clarity. However, the Xilinx Virtex-II FPGA is described in detail in pages 33–75 of the "Virtex-II Platform FPGA Handbook", published December, 2000, available from Xilinx, Inc., 2100 Logic Drive, San Jose, Calif. 95124, which pages are incorporated herein by reference.

Figure 7:
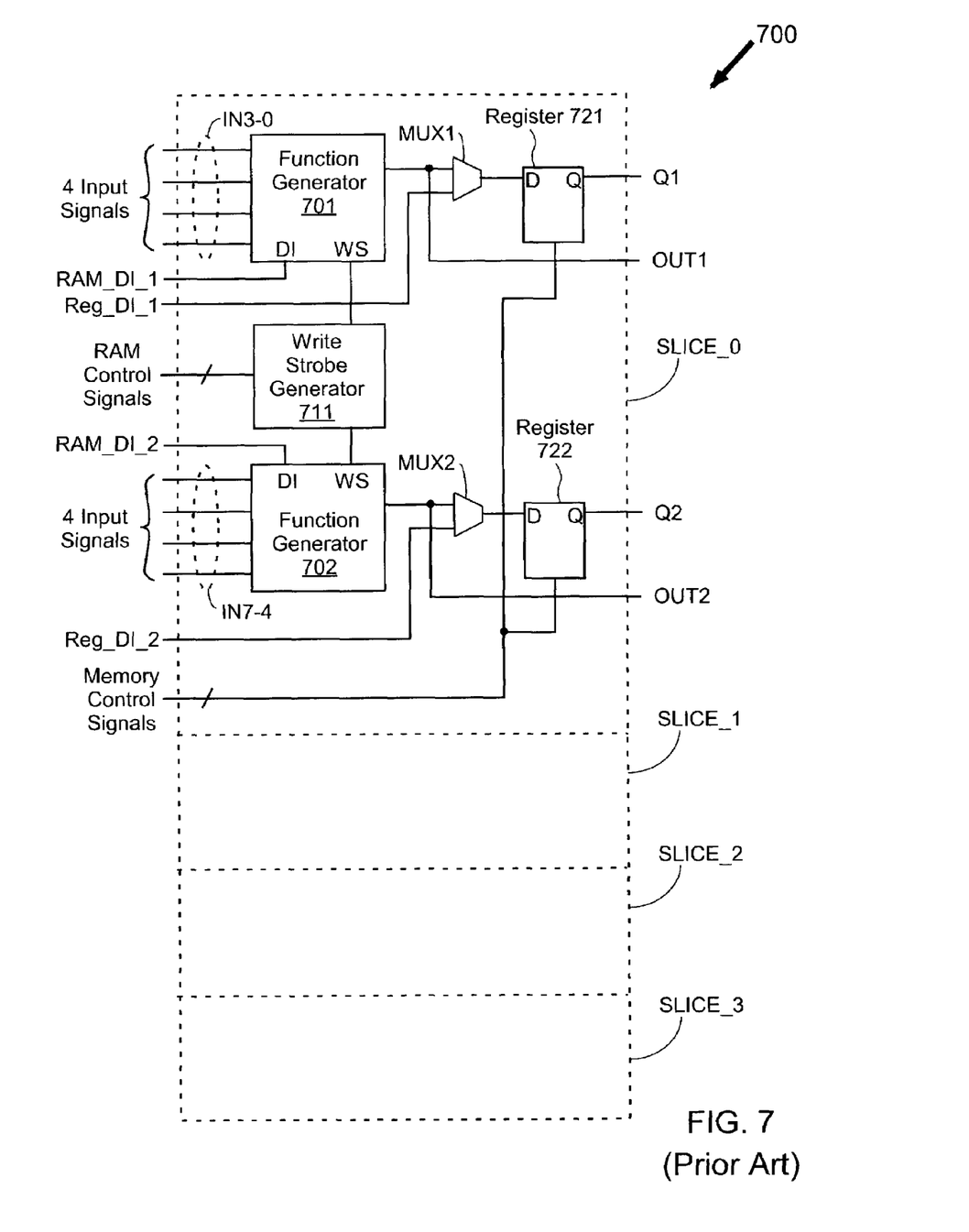
FIG. 7 is a block diagram of an exemplary configurable logic block (CLB) in an FPGA.

FIG. 7 is a simplified block diagram of a Virtex-II CLB. CLB 700 includes four "slices" SLICE_0–3, each slice including the logic shown in FIG. 7 for SLICE_0. (Other logic in the slice not relevant to the present application is omitted from FIG. 7, for clarity.) Each slice includes two function generators 701–702. Each function generator can be programmed to function as any of a 4-input lookup table, a 16-bit shift register, and 16 bits of random access memory (RAM) in any of several configurations. When the function generators are configured to function as RAM, a write strobe generator circuit 711 is active, and controls the write functions of the RAM.

Multiplexer MUX1 passes either the output of function generator 701 or an independent input signal Reg_DI_1 to 1-bit register 721. Register 721 can be configured as either a flip-flop or a latch. The outputs of function generator 701 and register 721 are both optionally provided as outputs of the slice (OUT1 and Q1, respectively). Thus, the function generator and 1-bit register can be used independently of each other or can be coupled together so the register stores the function generator output signal.

The elements in the other half of the slice, including function generator 702, multiplexer MUX2, and 1-bit register 722, are coupled together in a similar manner.

Thus, it can be seen that a Virtex-II CLB includes eight function generators that optionally be configured as RAM blocks. Each function generator can be configured, for example, as a 16×1 single-port RAM. The two function generators of a single CLB slice can also be configured to work together as a 16×1 dual-port RAM, as described on pages 48–50 of the "Virtex-II Platform FPGA Handbook", referenced above. By combining all eight function generators in a CLB, the function generators can be used to implement a 16×4 RAM, i.e., a RAM that includes 16 words of 4 bits each.

As shown in FIG. 6, a Virtex-II FPGA also includes blocks of dedicated RAM (BRAM or Block RAM). Large memories are most efficiently implemented (in terms of resource usage and resulting operating speed) in the dedicated RAM blocks. However, in some applications that include only small memories it can be advantageous to implement memory circuits in the much smaller function generators of the CLBs. The accumulator-based load-store CPU architecture described above provides one such application.

Figure 8:
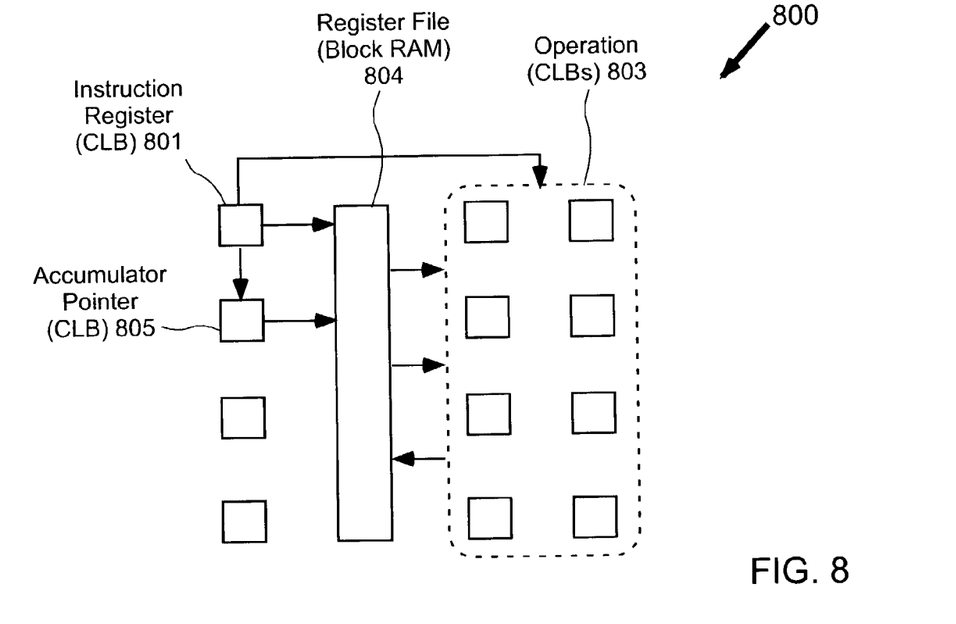
FIG. 8 shows a first implementation of a load-store CPU with a moveable accumulator in an FPGA that includes dedicated RAM blocks.

FIG. 8 shows a relatively straightforward implementation of an accumulator-based load-store CPU architecture in a Virtex-II FPGA. The CPU includes an instruction register 801, an accumulator pointer 805, an operation block 803, and a register file 804. As described above, this CPU architecture is well suited to small instruction sizes. Therefore, an instruction size of eight bits is assumed for exemplary purposes. The instruction register, being 8 bits wide, is implemented in this example in the eight 1-bit registers of a single CLB.

The register file in this example includes 16 words. Therefore, the accumulator pointer must be able to address one of 16 locations, and is consequently four bits wide. Even with supporting logic (if needed), the accumulator pointer can also be implemented in this example in a single CLB. However, the operation block includes enough registers and combinatorial logic to require several CLBs.

The exemplary register file includes 16 words of 8 bits. A Block RAM in the Virtex-II FPGA can easily implement a register file of this size. Thus, the register file in this example is implemented in a single Block RAM logic block.

There are drawbacks to this implementation, however. First, although only a portion of the Block RAM is needed for this application, the entire Block RAM has been allocated and is now unavailable for other purposes. Second, a large dedicated RAM block is designed to implement large memories. Therefore, it may be unnecessarily slow when used to implement smaller memories.

Figure 9:
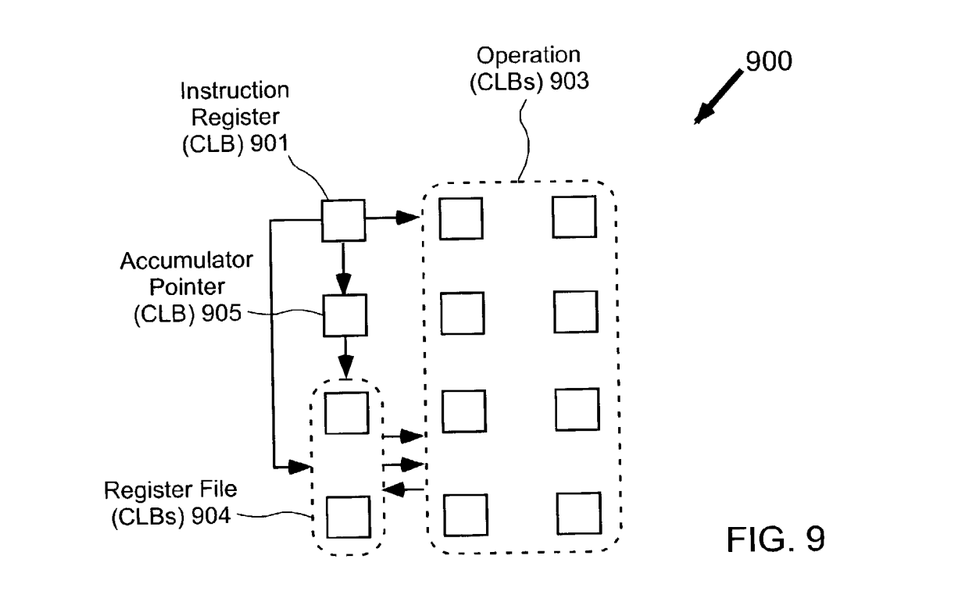
FIG. 9 shows a more efficient implementation of a load-store CPU with a moveable accumulator in an exemplary FPGA.

FIG. 9 shows another implementation of the accumulator-based load-store CPU architecture of FIG. 5. This implementation takes advantage of the properties of the Virtex-II function generator to implement the entire CPU using CLBs, without using a dedicated RAM block.

As in the implementation of FIG. 8, the instruction register 901, accumulator pointer 905, and operation block 903 are implemented using CLBs. However, in implementation 900 of FIG. 9, the register file 904 is implemented in CLBs as well.

As described above, the eight function generators of a CLB can be used to implement a 16×4 dual-port RAM, i.e., a dual-port RAM that includes 16 words of 4 bits each. Therefore, the exemplary 16×8 register file can be implemented using two CLBs. (In implementations with larger register files, more than two Virtex-II CLBs are required. Registers files that are 16×4 or smaller can be implemented in a single CLB.)

The embodiment of FIG. 9 has several advantages. One advantage is that the pictured implementation can be used in FPGAs that do not include dedicated Block RAM blocks. Another is that the implementation is smaller than that of FIG. 8, because only two CLBs are used instead of an entire Block RAM block. Another advantage is that the CLBs can be accessed using special fast routing resources called "direct connects", and other CLB routing that can be faster than the routing used to access the Block RAM.

Figure 10:
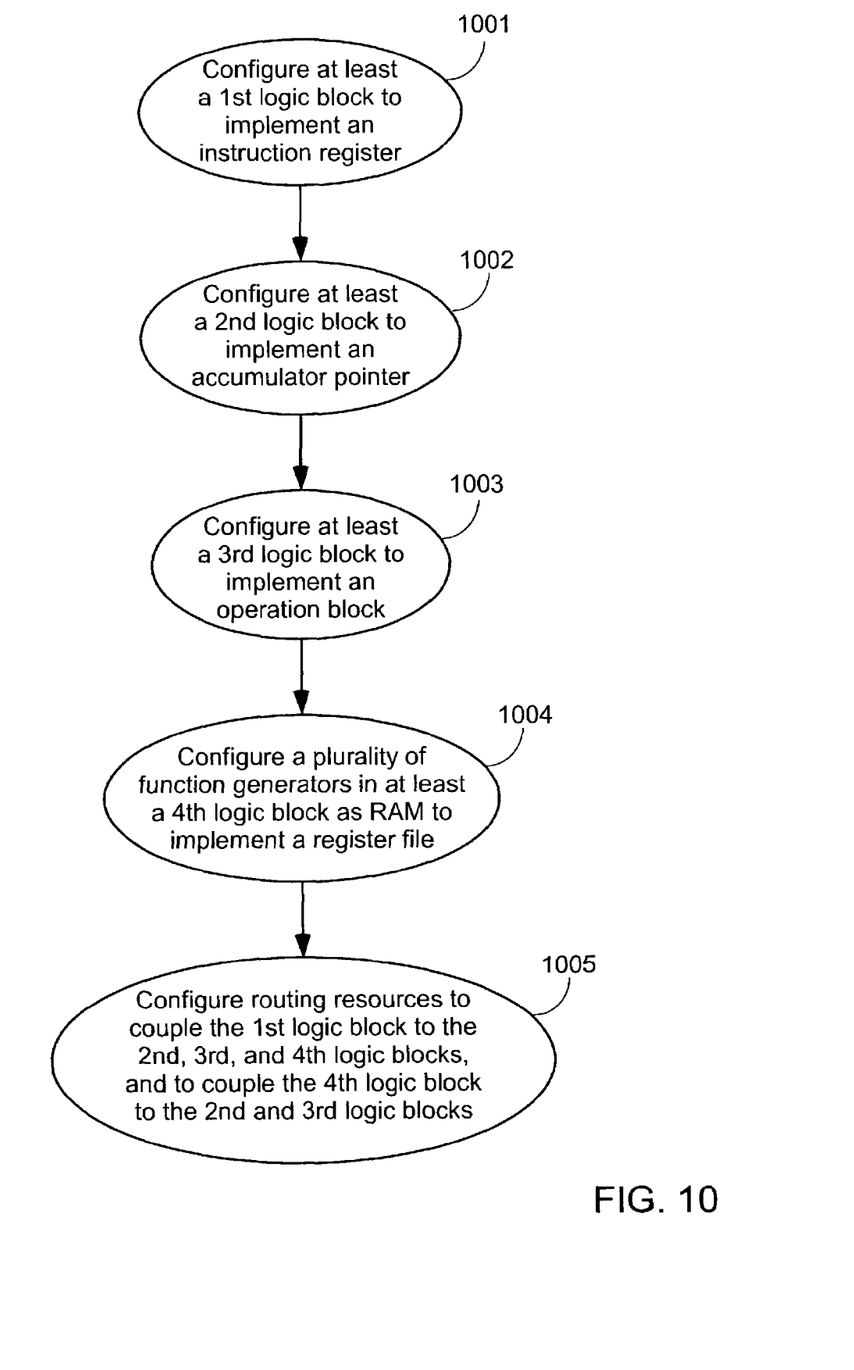
FIG. 10 shows a series of steps that can be used to implement the CPU of FIG. 9 in an FPGA having function generators implemented as lookup tables.

FIG. 10 shows a series of steps to be followed when implementing an accumulator-based load-store CPU using a CLB implementation such as that shown in FIG. 9. The order of the steps shown in FIG. 10 is immaterial. The steps can be performed in any order, or simultaneously.

In step 1001, at least a first logic block (e.g., a CLB) is configured to implement an instruction register. In step 1002, at least a second logic block is configured to implement an accumulator pointer. In step 1003, at least a third logic block is configured to implement an operation block. In step 1004, at least a fourth logic block is configured as a register file by configuring one or more function generators in the logic block as RAM blocks that will be used to store the register file data. In step 1005, routing resources are used to make the interconnections as shown in FIG. 5.

In one embodiment, the first, second, third, and fourth logic blocks are all distinct from one another. However, in some instances the logic can be combined into the same CLB. For example, the operation block includes a large amount of combinatorial logic, while the instruction register is conveniently implemented in the one-bit registers of a CLB. Thus, the combinatorial logic of the operation block can be implemented using the function generators of a logic block configured as lookup tables, while the instruction register is implemented using the one-bit registers of the same logic block. Referring to FIG. 10, in this example the first and third logic blocks are the same logic block. Similarly, the second and third logic blocks can be the same logic block. Because the register file is implemented using the function generators of the fourth logic block, the fourth logic block can be the same, for example, as the first or second logic block.

The exemplary register file described herein is 16×8, i.e., it includes 16 registers of eight bits each. However, register files of other sizes can be used. For example, a 16×16 register file can be implemented in four Virtex-II CLBs, and a 16×4 register file can be implemented in a single Virtex-II CLB. Register files of other sizes can also be implemented using this technique, although the Block RAM implementation is more efficient for large register files.

The methods of the present invention can be performed in either hardware, software, or any combination thereof, as those terms are currently known in the art. In particular, the present methods can be carried out by software, firmware, or microcode operating on a computer or computers of any type. Additionally, software embodying the methods of the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

Those having skill in the relevant arts of the invention will now perceive various modifications and additions that can be made as a result of the disclosure herein. For example, PLDs, FPGAs, logic blocks, CLBs, function generators, registers, accumulator pointers, instruction registers, register files, operation blocks, and other components other than those described herein can be used to implement the invention.

Moreover, some components are shown directly connected to one another while others are shown connected via intermediate components. In each instance the method of interconnection establishes some desired electrical communication between two or more circuit nodes. Such communication may often be accomplished using a number of circuit configurations, as will be understood by those of skill in the art.

Accordingly, all such modifications and additions are deemed to be within the scope of the invention, which is to be limited only by the appended claims and their equivalents.

What is claimed is:

1. A circuit implementation of a central processing unit (CPU) in a programmable logic device (PLD) comprising an array of similar programmable logic blocks and programmable routing resources interconnecting the logic blocks, the circuit implementation comprising:
    at least a first one of the logic blocks configured to implement an instruction register;
    at least a second one of the logic blocks configured to implement an accumulator pointer;
    at least a third one of the logic blocks configured to implement an operation block;
    at least a fourth one of the logic blocks comprising one or more programmable function generators configured as RAM blocks, the at least a fourth logic block being configured to implement a register file within the one or more function generators;
    a first set of routing resources configured to couple the first logic block to the second, third, and fourth logic blocks; and
    a second set of routing resources configured to couple the fourth logic block to the second and third logic blocks.

2. The circuit implementation of claim 1, wherein:
    the first set of routing resources provides signals from the instruction register to the accumulator pointer, from the instruction register to the operation block, and from the instruction register to the register file; and
    the second set of routing resources provides signals from the accumulator pointer to the register file, from the operation block to the register file, and from the register file to the operation block.

3. The circuit implementation of claim 1, wherein the PLD is a field programmable gate array (FPGA).

4. The circuit implementation of claim 3, wherein the first, second, third, and fourth logic blocks are configurable logic blocks (CLBs).

5. The circuit implementation of claim 1, wherein the first, second, third, and fourth logic blocks are all distinct from each other.

6. The circuit implementation of claim 1, wherein the function generators are paired, each pair of function generators is configured as a 16×1 dual-port RAM block, each pair of function generators provides one bit of the register file, and the register file includes no more than 16 registers.

7. The circuit implementation of claim 1, wherein the fourth logic block comprises eight paired function generators, each pair of function generators is configured as a 16×1 dual-port RAM block, and the fourth logic block implements a 16×4 register file.

8. The circuit implementation of claim 1, wherein the at least a fourth logic block includes at least a fifth logic block coupled to the fourth logic block, the function generators are paired, each pair of function generators is configured as a 16×1 dual-port RAM block, and the register file includes more than 16 registers.

9. A method of implementing a central processing unit (CPU) in a programmable logic device (PLD) comprising an array of similar programmable logic blocks and programmable routing resources interconnecting the logic blocks, the method comprising:
    configuring at least a first one of the logic blocks to implement an instruction register;

configuring at least a second one of the logic blocks to implement an accumulator pointer;

configuring at least a third one of the logic blocks to implement an operation block;

configuring at least a fourth one of the logic blocks as a register file, the at least a fourth logic block comprising one or more programmable function generators, comprising configuring the one or more function generators as RAM blocks implementing the register file;

configuring a first set of routing resources to couple the first logic block to the second, third, and fourth logic blocks; and configuring a second set of routing resources to couple the fourth logic block to the second and third logic blocks.

10. The method of claim 9, wherein:

configuring the first set of routing resources comprises configuring the first set of routing resources to provide signals from the instruction register to the accumulator pointer, from the instruction register to the operation block, and from the instruction register to the register file; and configuring the second set of routing resources comprises configuring the second set of routing resources to provide signals from the accumulator pointer to the register file, from the operation block to the register file, and from the register file to the operation block.

11. The method of claim 9, wherein the PLD is a field programmable gate array (FPGA).

12. The method of claim 11, wherein the first, second, third, and fourth logic blocks are configurable logic blocks (CLBs).

13. The method of claim 9, wherein the first, second, third, and fourth logic blocks are all distinct from each other.

14. The method of claim 9, wherein configuring the at least a fourth logic block as a register file comprises configuring pairs of the function generators as 16×1 dual-port RAM blocks, each pair of function generator provides one bit of the register file, and the register file includes no more than 16 registers.

15. The method of claim 9, wherein the fourth logic block comprises eight paired function generators, configuring the at least a fourth logic block as a register file comprises configuring each pair of function generators in the fourth logic block as a 16×1 dual-port RAM block, and the fourth logic block implements a 16×4 register file.

16. The method of claim 9, wherein configuring the at least a fourth logic block as a register file comprises configuring pairs of function generators in the at least fourth and fifth logic blocks as 16×1 dual-port RAM blocks, and the register file includes more than 16 registers.

17. A central processing unit (CPU) implemented in a programmable logic device (PLD) comprising an array of similar programmable logic blocks, the CPU comprising:

an accumulator pointer having an input terminal and an output terminal;

an operation block having first, second, and third input terminals and an output terminal;

an instruction register having a first output terminal coupled to the first input terminal of the operation block, a second output terminal coupled to the input terminal of the accumulator pointer, and a third output terminal; and a register file having a first input terminal coupled to the output terminal of the accumulator pointer, a second input terminal coupled to the output terminal of the operation block, a third input terminal coupled to the third output terminal of the instruction register, and first and second output terminals coupled to the second and third input terminals of the operation block, wherein the register file comprises one or more of the programmable logic blocks of the PLD each comprising function generators optionally configurable as RAM blocks, the function generators being configured as RAM blocks in which the register file data is stored during operation of the CPU, and wherein each of the accumulator pointer, the operation block, and the instruction register comprises one or more of the programmable logic blocks of the PLD.

18. The CPU of claim 17, wherein the PLD is a field programmable gate array (FPGA).

19. The CPU of claim 18, wherein the logic blocks are configurable logic blocks (CLBs).

20. The CPU of claim 17, wherein the function generators are paired, each pair of function generators is configured as a 1 6×1 dual-port RAM block, each pair of function generators provides one bit of the register file, and the register file includes no more than 16 registers.

21. The CPU of claim 17, wherein each logic block comprises eight paired function generators, each pair of function generators is configured as a 16×1 dual-port RAM block, and the register file is a 16×4 register file.

22. The CPU of claim 17, wherein the register file comprises at least two logic blocks including paired function generators configured as 16×1 dual-port RAM blocks, and the register file includes more than 16 registers.

23. A programmable logic device (PLD), comprising:

a programmable routing structure; and a plurality of similar programmable logic blocks interconnected by the programmable routing resources, each logic block including a plurality of one-bit registers and a plurality of function generators configurable as lookup tables and as RAM blocks, wherein:

at least a first one of the logic blocks is configured to implement an instruction register, at least a second one of the logic blocks is configured to implement an accumulator pointer, at least a third one of the logic blocks is configured to implement an operation block, at least a fourth one of the logic blocks is configured to implement a register file by configuring pairs of the function generators of the fourth logic block as dual-port RAM blocks wherein register file data is stored, a first set of routing resources is configured to couple the first logic block to the second, third, and fourth logic blocks, and a second set of routing resources is configured to couple the fourth logic block to the second and third logic blocks.

24. The PLD of claim 23, wherein:

the instruction register is implemented using the one-bit registers in the first logic block;

the accumulator pointer is implemented using the one-bit registers in the second logic block; and the operation block is implemented by configuring the function generators in the third logic block as lookup tables.

25. The PLD of claim 23, wherein the PLD is a field programmable gate array (FPGA).

26. The PLD of claim 25, wherein the first, second, third, and fourth logic blocks are configurable logic blocks (CLBs).

27. The PLD of claim 23, wherein the first, second, third, and fourth logic blocks are all distinct from each other.

28. The PLD of claim 24, wherein the fourth logic block is the same logic block as one of the first and second logic blocks.

* * * * *